(12) United States Patent
Rácz et al.

(10) Patent No.: US 10,742,485 B2
(45) Date of Patent: Aug. 11, 2020

(54) METHOD FOR DETERMINING A SEQUENCE OF EVENTS, A DETERMINATION DEVICE FOR DETERMINING A SEQUENCE OF EVENTS, AND A PROVIDING DEVICE

(71) Applicant: Telefonaktiebolaget LM Ericsson (publ), Stockholm (SE)

(72) Inventors: András Rácz, Budapest (HU); Norbert Reider, Tényö (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/323,831

(22) PCT Filed: Aug. 24, 2016

(86) PCT No.: PCT/EP2016/069973
§ 371 (c)(1),
(2) Date: Feb. 7, 2019

(87) PCT Pub. No.: WO2018/036621
PCT Pub. Date: Mar. 1, 2018

(65) Prior Publication Data
US 2019/0173737 A1 Jun. 6, 2019

(51) Int. Cl.
*H04W 24/08* (2009.01)
*H04L 12/24* (2006.01)

(52) U.S. Cl.
CPC ...... *H04L 41/0636* (2013.01); *H04L 41/0631* (2013.01); *H04W 24/08* (2013.01); *H04L 41/5009* (2013.01)

(58) Field of Classification Search
CPC .. H04W 24/06; H04W 24/08; H04L 41/0636; H04L 41/0631
See application file for complete search history.

(56) References Cited

U.S. PATENT DOCUMENTS

2011/0244800 A1* 10/2011 Bogestam ............... H04W 4/80
455/41.2
2015/0049735 A1* 2/2015 Choi-Grogan .... H04W 36/0027
370/331

(Continued)

OTHER PUBLICATIONS

Hasan Khan, M. M. et al., "Troubleshooting Interactive Complexity Bugs in Wireless Sensor Networks Using Date Mining Techniques", ACM Transactions on Sensor Networks, Jan. 31, 2014, pp. 1-35, ACM.

(Continued)

*Primary Examiner* — Wei Zhao
(74) *Attorney, Agent, or Firm* — Coats & Bennett, PLLC

(57) ABSTRACT

The present invention relates to a method and a device for analyzing and determining a root cause based on a sequence of events including a first event in a mobile communication network system. In particular, the present invention provides a method for determining a sequence of events including a first event in a mobile communication network system, comprising the steps of identifying at least one second event before and/or after the first event; determining a probability of an occurrence of each second event before and/or after the first event, —determining a probability of an occurrence of each second event before and/or after each other second event; and determining a sequence of first and second events with the highest probability.

16 Claims, 6 Drawing Sheets

(56) References Cited

U.S. PATENT DOCUMENTS

2015/0222477 A1    8/2015  Ranjan et al.
2015/0287053 A1*  10/2015  Fredette ................ G06Q 30/02
                                                               705/7.29

OTHER PUBLICATIONS

Li, Z. et al., "Failure event prediction using the Cox proportional hazard model driven by frequent failure signatures", IEEE Transactions, vol. 39, No. 3, Jan. 1, 2007, pp. 303-315, IEEE.

* cited by examiner

Fig. 7
A)
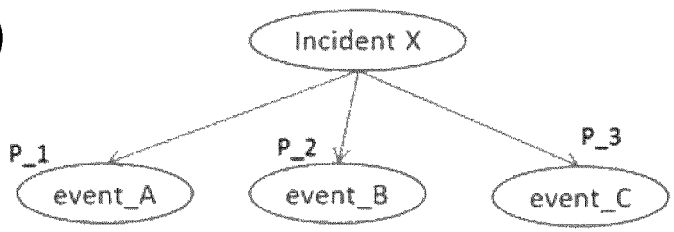
$P\_1 + P\_2 + P\_3 > 100\%$
B)
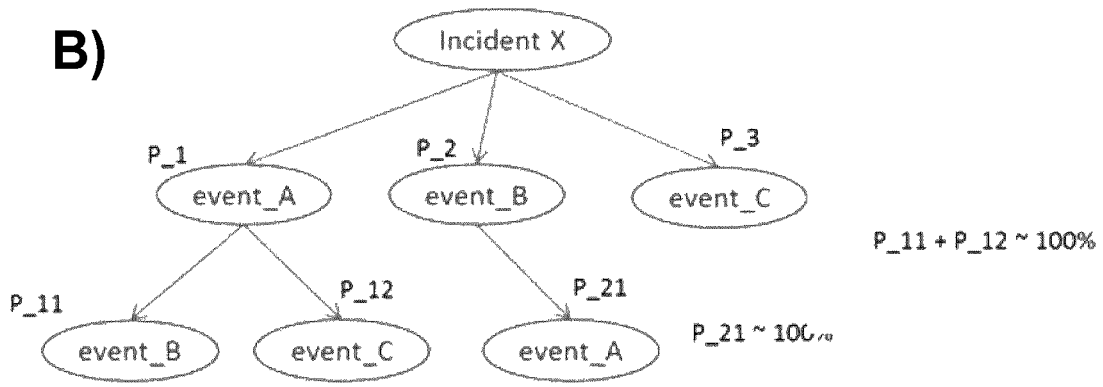
$P\_11 + P\_12 \sim 100\%$
$P\_21 \sim 100\%$
C)
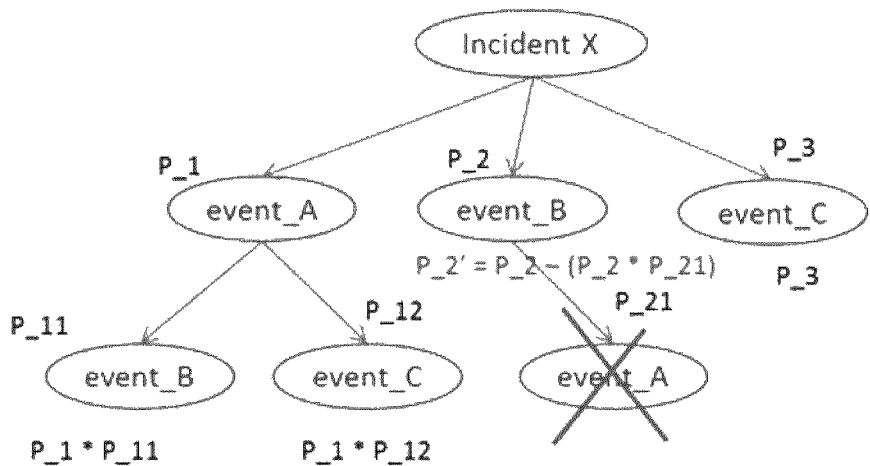

METHOD FOR DETERMINING A SEQUENCE OF EVENTS, A DETERMINATION DEVICE FOR DETERMINING A SEQUENCE OF EVENTS, AND A PROVIDING DEVICE

TECHNICAL FIELD

The present invention relates to a method for analyzing and determining a root cause based on a sequence of events including a first event in a mobile communication network system. In particular, the present invention relates to determining a sequence of first and second events with the highest probability for determining a cause for the first event.

BACKGROUND

Determining a cause or root cause of an event such as a dropped call, a failed connection set up, or a similar quality problem in a communication network system is important to resolve the underlying problem and avoid any such instances in the future.

Performance management of for instance voice services including call quality monitoring, root cause detection, fault localization has been developed for Circuit Switched (CS) domain based networks such as 2G and 3G networks. However, in next-generation networks such as LTE voice services are provided by a packet-switched (PS) domain and via an IP Multimedia Subsystem (IMS). However, the performance management developed for CS domain based networks is not applicable to the PS domain and IMS domain based networks.

Providing voice services for instance in LTE can happen only via the PS domain and via the IMS system as compared to voice services provided for instance in 2G and 3G networks, which are carried via the CS domain. Since there are fundamental differences in the CS and PS domain architectures and the way how voice is carried over these systems, the way how the performance management of the voice services, including call quality monitoring, root cause detection, fault localization can be done in the PS domain is fundamentally different from those developed for the circuit switched domain.

In the PS domain, a control plane functionality for voice services, i.e., signaling to setup, tear down a call, etc., are done via the IMS system using the Session Initiation Protocol (SIP) protocol, while a voice communication is carried in a user plane, as packet switched traffic via a Real-Time Transport Protocol (RTP) or A Real-Time Control Protocol (RTCP).

As an example a simplified view of a typical prior art system architecture for Voice over LTE (VoLTE) is illustrated in FIG. 5. As shown in FIG. 5, signaling plane nodes include Proxy Call and Session Control Function (P-CSCF) and Serving Call Session Control Function (S-CSCF). In a generic setup there can be a P-CSCF and S-CSCF on both ends of a call in home and visiting networks. In specific cases, however the two sides and even the two nodes may be one single node. In the user plane the traffic goes through the Border Gateway (BGW) nodes, also called media gateway nodes that terminate the RTP/RTCP communication toward the terminal on one end and reopen the RTP/RTCP communication toward the terminal on the other end. FIG. 5 shows a setup when different BGW nodes serve the Mobile Originating (MO) and Mobile Terminating (MT) side of the call.

In order to monitor call quality and different kinds of call success Key Performance Indicators (KPIs), data collection sources from a signaling plane and a user plane need to be available. These can be collected via applying packet probes both for signaling and voice packets and derive KPIs based on the information extracted from the probed packets.

For example to determine call setup, tear-down success ratios, the signaling plane messages can be analyzed by looking into message result codes. In order to determine speech quality KPIs, for example Mean Opinion Score (MOS) metrics, the user plane RTP/RTCP packets need to be analyzed, for instance to check whether there was any speech packet loss or packet reordering or the like causing speech quality impairments.

Although the above prior art method gives the capability to detect the occurrence of for instance signaling or speech quality related problems, the prior art method cannot provide insight to the cause of the problem, which is needed to resolve, the problem and avoid the problem in future. A typical approach currently used to identify a cause, i.e. root cause, of a quality problem is often based on the analyses of certain call related events in isolation for instance with manual or basic or elementary statistical methods. For example, the root cause of call setup problems is often analyzed purely based on cause codes reported in a respective call setup signaling message. Although the analysis of single call flow messages is necessary, it is often not sufficient to uncover the real causes behind a first event, i.e. incident. To discover such a relationship, it is required to analyze the incident, e.g. negative first event such as a call setup failure, in relation to second events, i.e. other events or occurrences, for instance including events occurring at other parts of the network communication system. For example, an abnormal call termination may be the consequence of an unsuccessful handover in the network communication system, i.e. radio network, which may be attempted long before the abnormal call termination event, i.e. several seconds before, and a cause code of the termination typically does not hint at any such relation to other events, e.g. happening in another domain of the network.

Thus, there is a need to analyze events occurring in combination. However this requires a high level of domain and expert knowledge. Therefore, these tasks are currently typically done by manual work.

According to the prior art for instance root cause symptoms are often identified by making a large number of active test calls with special terminals, capable of recording and reporting all events in detail and then manually analyzing generated logs one-by-one. This approach is, however not scalable, very sensitive to the specific experts knowledge and prone to human errors and limitations.

SUMMARY

The above-mentioned problems and drawbacks of the conventional methods are solved by the subject matter of the independent claims. Further preferred embodiments are described in the dependent claims.

According to an aspect of the present invention there is provided a method for determining in a determination device a sequence of events including a first event in a mobile communication network system, comprising the steps of identifying at least one second event before and/or after the first event; determining a probability of an occurrence of each second event before and/or after the first event; determining a probability of an occurrence of each second event before and/or after each other second event; and determining a sequence of first and second events with the highest probability; wherein the first and/or second events are provided by a providing device.

According to another aspect of the present invention there is provided a determination device for determining a sequence of events including a first event in a mobile communication network system, comprising identifying means configured to identify at least one second event before and/or after the first event; determining means configured to determine a probability of an occurrence of each second event before and/or after the first event; determining means configured to determine a probability of an occurrence of each second event before and/or after each other second event; determining means configured to determine a sequence of first and second events with the highest probability.

According to another aspect of the present invention there is provided a providing device in a communication network system configured to provide information indicating a first and/or second event to the communication network system or an external entity processing the first and/or second event to determine a cause of the first event.

According to another aspect of the present invention a computer program is provided that comprises code, the code, when executed on processing resources, instructs the processing resources to perform a method embodiment of the present invention.

According to yet another aspect of the present invention a computer program product is provided that stores a code, the code, when executed on processing resources, instructs the processing resources to perform a method embodiment of the present invention.

BRIEF DESCRIPTION OF THE DRAWINGS

Embodiments of the present invention, which are presented for better understanding the inventive concepts but which are not to be seen as limiting the invention, will now be described with reference to the figures in which:

FIG. 7A, 7B, 7C show a tree hierarchy in different steps for determining a sequence of first and second events according to an embodiment of the present invention.

The present invention according to one embodiment proposes an automatic approach that is capable to identify the most typical patterns of event occurrence sequences associated with a negative incident, where the events are for instance taken from multiple network domains.

Figure 1:
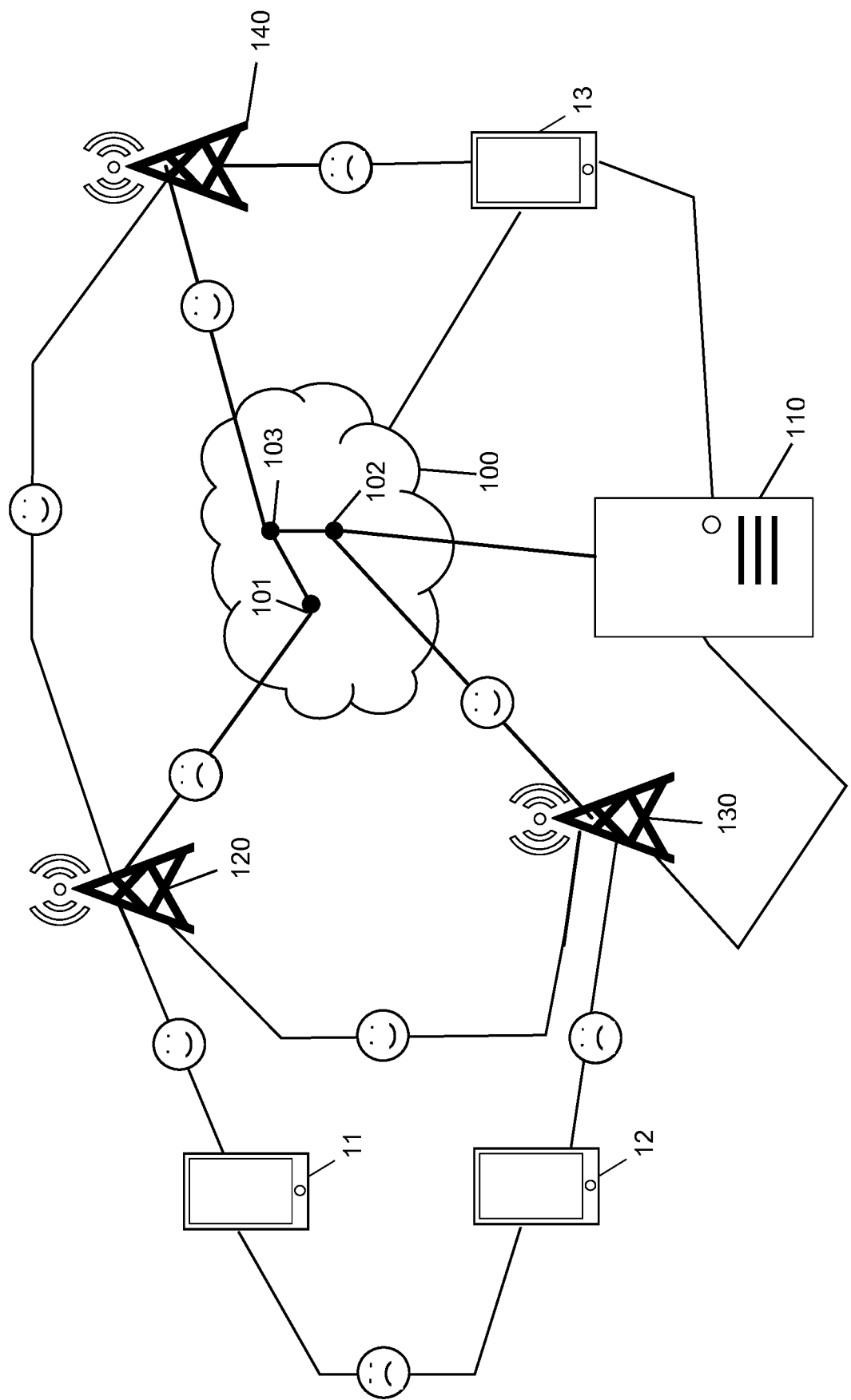
FIG. 1 shows a schematic overview of an exemplary network environment in which a sequence of events is determined according to an embodiment of the invention.

FIG. 1 shows a schematic overview of an exemplary network environment in which a sequence of events is determined according to an embodiment of the invention. A network 100, for instance a mobile communication network, includes a number of network elements 101-103 such as network nodes, routers, gateways, switches, switching centers, base stations, wire-less or wire-bound links, and the like. In general, the purpose of the network 100 will be to provide a network service to a plurality of user terminals 11, 12, 13 where the usual services include, telephony, videotelephony, chatting, interest browsing, email access, and the like. For this purpose the network elements 101-103 will convey data via base stations 120, 130, 140 to and from the plurality of user terminals 11, 12, 13. The base stations 120, 130, 140 may be connected to the individual user terminals 11, 12, 13 via the usual radio links for transmitting and receiving data to and from a user terminal 11, 12, 13. The network 100 may further have a connection to some sort of network entity 110, such as a server or a resource in a data center. The network entity 110 may also have a direct link to any one of the base stations 120, 130, 140 or the user terminals 11, 12, 13.

Within the network 100 or within the system including the network 100, the base stations 120, 130, 140 and the user terminals 11, 12, 13 a plurality of different types of processes are performed such as connection set up between base stations and user terminals, connection set up between base stations and network nodes, user terminal hand over procedures, signal transfer for communication, signal transfer for controlling a base station or user terminal and the like. These processes are either successful or fail, indicated in FIG. 1 by a smiley or frowny face respectively.

According to one embodiment of the present invention a failed process, i.e. a negative event, is selected for root cause analysis, that is an event of interest for determining the cause of a failed process. The first event may be a failed connection set up between a base station and a user terminal, a failed connection set up between a base station and a network node, a failed hand over of a user terminal between base stations, a failed signal transfer for communication, a failed signal transfer for controlling a base station or user terminal or the like.

Subsequently at least one second event in the system is identified. The second event may be in time before or after the first event. The second event may be in the same part, i.e. domain, or different parts of the system as the first event, the system including the network 100, the base stations 120, 130, 140, and user terminals 11, 12, 13. The second event may be a successful or failed connection set up between base stations and user terminals, connection set up between base stations and network nodes, user terminal hand over procedures, signal transfer for communication, signal transfer for controlling a base station or user terminal or the like.

According to one embodiment of the present invention the first and second events may be reported by the network nodes 101, 102, 103, the base stations 120, 130, 140, the user terminals 11, 12, 13 to the network 100 or to the network entity 110 for further processing. For instance the first and second events may be reported directly to the network entity 110 or may be reported to another entity within the network 100 and for instance subsequently reported to the network entity 110.

Subsequently a probability of an occurrence of each second event in relation to the first event is determined. For instance a second event before the first event may have a different probability than a second event after the first event. That is, for example a failed handover request may directly lead to a dropped call, thus, the probability of a dropped call after a failed handover request may be higher than before a failed handover request.

According to one embodiment successful and failed processes, i.e. positive and negative type of events, are considered to determine the probability of occurrence of each second event in relation to the first event.

In a further step the probability of an occurrence of each second event in relation to each other second event similar to the determination of the probability of each second event in relation to the first event is further determined.

This way, a sequence of first and second events can be determined with its respective probability. That is, for instance failed signaling of a control message to a base station 120, a successful handover of user terminal 11 to base station 130, and a failed communication signaling between base, station 130 and user terminal 12 may be given a certain probability for instance in relation to a failed direct communication between user terminal 11 and 12. This way all events or instances to be considered for root cause analysis are arranged in sequences and a probability of each sequence is determined, for instance based on all events or instances.

In case the event patterns include events from multiple domains, one embodiment of the method according to the present invention is thus capable of discovering potential dependencies between domains. Once the event sequences or sequence patterns are identified, an expert or a pre-configured set of expert rules can map these sequence patterns to actions or to further troubleshooting steps.

An advantage of the present invention according to one embodiment may be that a root cause identification process is automated for instance without neglecting complex inter-dependencies between events occurring at different domains and locations in the network.

According to one embodiment of the present invention the automated pattern search of event sequences is capable of considering the complex inter-dependencies between network domains essentially without the need of manual interaction and human expert knowledge.

Figure 2:
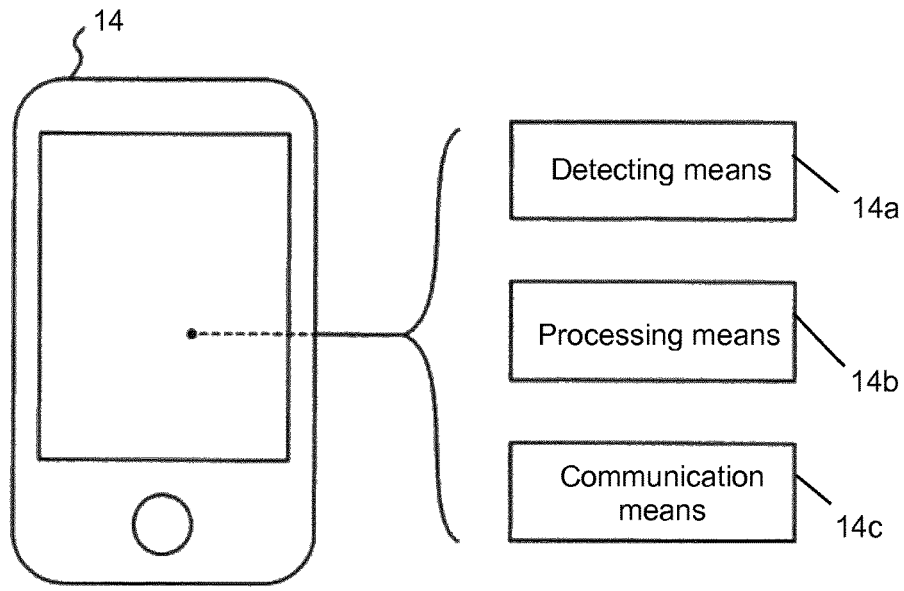
FIG. 2 shows a device for providing information indicating a first and/or second event to a communication network system.

FIG. 2 shows a device for providing information indicating a first and/or second event to a communication network system according to one embodiment of the present invention.

In one embodiment of the present invention the providing device is at least one of a mobile terminal, a network node, a network entity, and external equipment associated with the communication network system.

In one embodiment of the present invention the wireless communication device 14 detects the first and/or second event using detecting means 14*a*. The wireless communication device 14 may further be adapted to detect any information indicative of a first and/or second event. Thus the wireless communication device 14 may be provided with processing means 14*b* in order to process information about the first and/or second event. The wireless communication device 14 may further be adapted to report the detected first and/or second event to the wireless communication network 100 using communication means 14*c*. The wireless communication devices 11, 12, 13 depicted in FIG. 1 may or may not be provided with detecting means, processing means, and communication means respectively.

Figure 3:
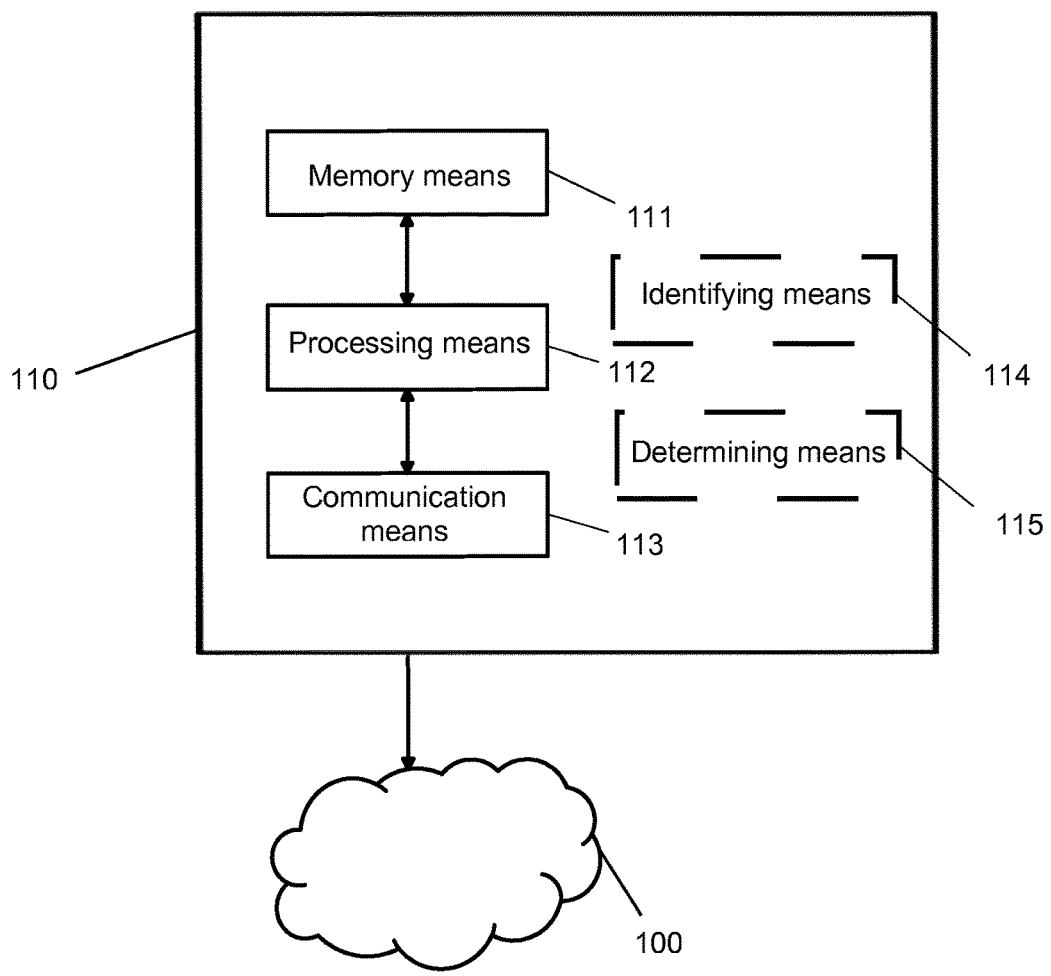
FIG. 3 shows a general entity embodiment of the invention for determining a sequence of events according to an embodiment of the invention.

FIG. 3 shows a general entity embodiment of the invention for determining a sequence of events according to an embodiment of the invention.

Specifically, the entity is configured to perform the determination of a sequence of events according to one or more embodiments of the present invention. The entity 110 generally comprises memory means 111, processing means 112, and communication means 113. As already mentioned, the entity may be connected to the network 100 over the communication means 113 and may be implemented as, for instance, a server, a computer, or processing resources provided by a data center or any suitable network element. Likewise, the entity 110 may be outside or inside the network 100, wherein in the latter case any network node or element may be provided with the corresponding functionalities.

In one embodiment of the present invention the determination device for determining a sequence of events further comprises determining means configured to determine a cause for the first event based on the sequence of first and second events with the highest probability.

Generally, the mentioned processing means 112 may be a processing unit, a processing unit collection, CPU, a share of a data/processing center and so on. The processing means 112 are capable of identifying first and second events, determining a probability of occurrence of second events in relation to the first event and in relation to one another, and determining a sequence of first and second events with the highest probability. The entity 110 may be further provided with separate identifying means 114 for identifying first and/or second events and determining means 115 for determining the probability and the sequence of the first and second events. However, the identifying means 114 and the determining means 115 may be provided within the processing means 112 or may be connected to either one of the memory means 111, processing means 112, or communication means 113.

The memory means 111 may specifically store code instructing the processing means 112 during operation to implement any method embodiment of the present invention. Particularly, the memory means 111 may store code instructing the processing means 112 during operation to receive any information indicating a first and/or second event, to identify first and/or second events, to determine a probability of occurrence of second event in relation to the first event and in relation to another, and to determine a sequence of first and second events with the highest probability.

For instance in one embodiment of the present invention the communication means 113 may connect to the network 100. Through the communication means 113 the entity 110 may receive any information indicating first and/or second events and to forward information indicating the sequence of first and second events with the highest probability. However, there may be more than one communication means to separately receive information and forward information, and for instance there may be several and/or individual ports provided for receiving information and forwarding information at the communication means 113.

Further, in one embodiment of the present invention the communication means 113 may be connected to several entities apart from the network 100 in order to receive information indicating first and/or second events. In general, the entity 110 may thus be provided with means to perform the method according to the embodiments of the present invention.

Figure 4:
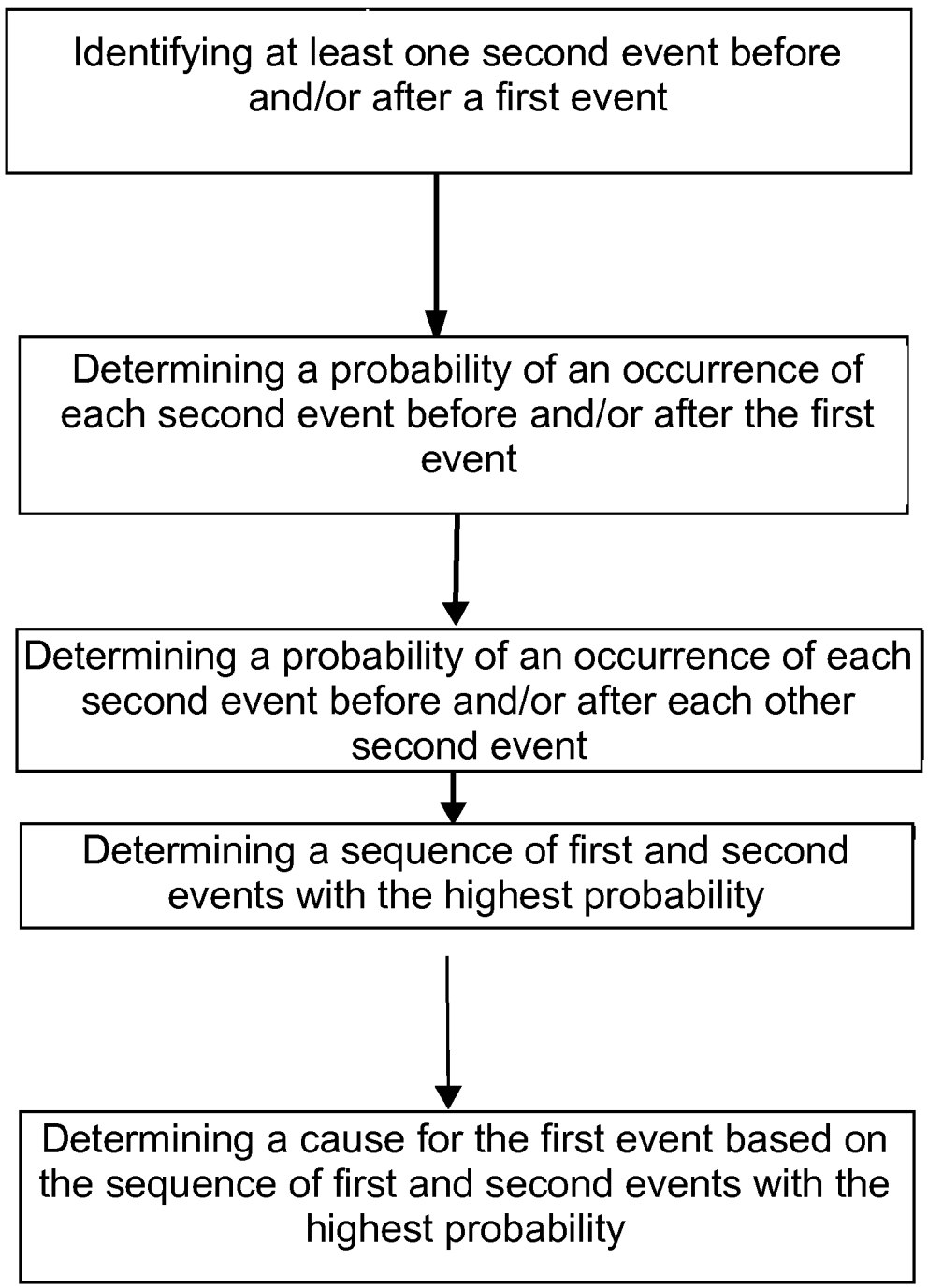
FIG. 4 shows a flowchart of a general method embodiment of the present invention.
Figure 5:
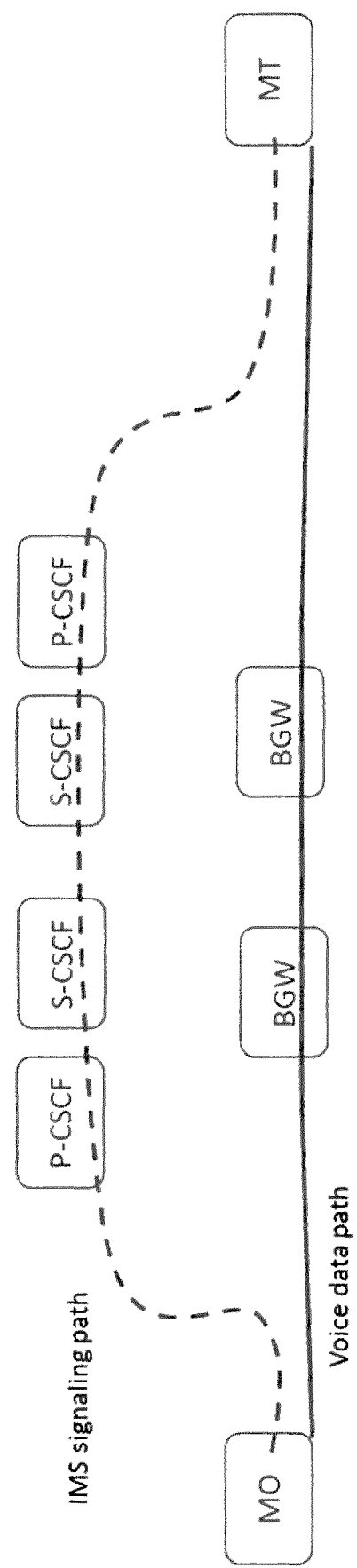
FIG. 5 shows a schematic overview of a system architecture for Voice over LTE.

FIG. 4 shows a flowchart of a general method embodiment of the present invention.

According to one embodiment of the present invention the determination of a sequence of first and second events and subsequently determination of a cause of the first event may be based on collecting events from different domains related to a call into one event sequence, for instance existing known technologies may be used for this purpose.

Accordingly the method includes a first step of identifying at least one second event before and/or after a first event. The first and or a second event may be provided by an external device, i.e. a providing device, which detects the first and/or second event and forwards information indicating the first and/or second event through a respective entity.

The method further includes determining a probability of an occurrence of each second event before and/or after the first event. Further a probability of an occurrence of each second event before and/or after each other second event is determined.

In other words searching for statistically relevant patterns in the stream of events may be carried out.

In one embodiment of the present invention the negative type and/or positive type of event is one of a predetermined relevant type.

In other words according to one embodiment the search, i.e. the event sequence pattern search method, may include taking a set of negative incidents of a specific type, e.g. call drop events or the like, that need to be root cause analyzed. For example, the IMS signaling event of an abnormal call termination can be such a negative incident that needs to be root cause analyzed. In this case, all the abnormal call termination events are taken as input to the root cause analysis method.

In one embodiment of the present invention the negative type of event is at least one of an abnormal call termination, a performance indicator event, and a failed process event.

For instance a negative type of event or incident may also be a Key Performance Indicator KPI event. A KPI event can be any event derived from a KPI value that is an event wherein a certain. KPI is greater than or below a threshold. Typical KPI types to be used include those that characterize the performance on the user plane, for example, the number of lost Real-Time Transport Protocol (RTP) packets may be such a KPI.

Figure 6:
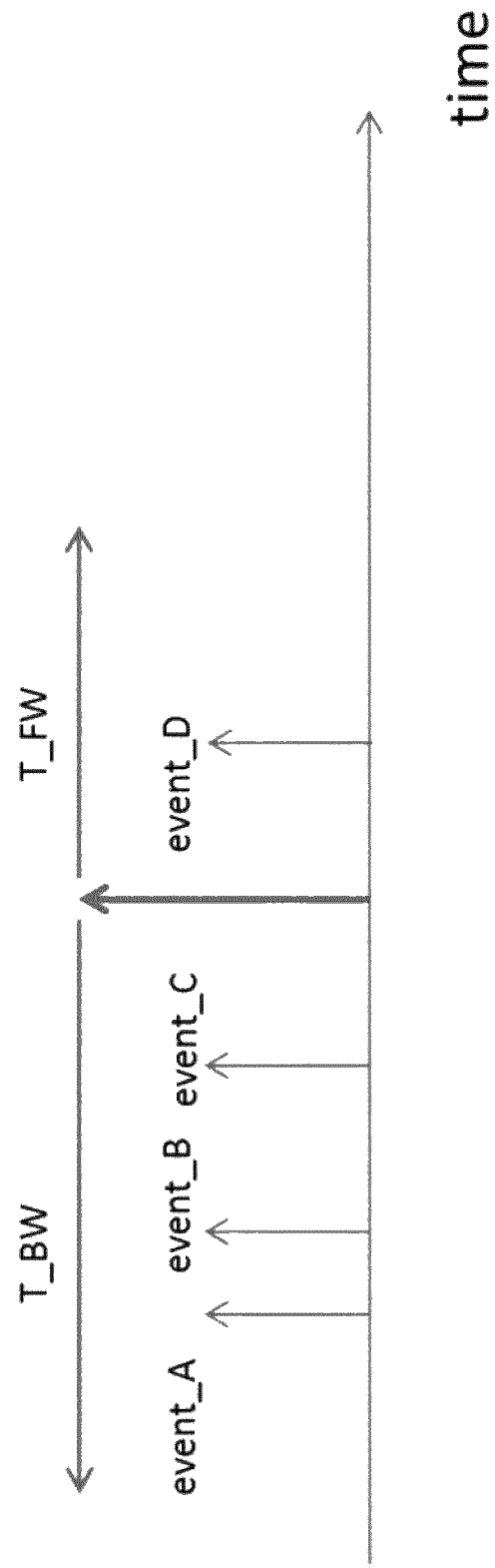
FIG. 6 shows a sequence in time of events to be considered for determining a cause of a first event according to an embodiment of the present invention.

According to one embodiment of the invention the method may further include setting a backward and a forward pattern search time window (T_BW and T_FW) around the first event of the negative incident. FIG. 6 shows a sequence in time of events to be considered for determining a cause of a first event according to an embodiment of the present invention.

According to another embodiment of the invention the method may further include recording other events, i.e. second events, such as signaling events or KPI events that occur in the T_BW and T_FW time windows, respectively, by order of relative occurrence. That is, the method may include counting in how many occurrences of the given negative incident, i.e. the first event, the particular signaling or KPI event has appeared in the T_BW or T_FW time windows. The set of relevant events to look for in the backward and forward windows can be pre-configured or may generally cover any possible single event or KPI event.

In one embodiment of the present invention the first event is a negative type of event and the second events are each a negative or positive type of event. That is the first event may for instance be a failed process. The second events, i.e. other events, may include an event of a failed or successful radio handover or a failed or successful Single Radio Voice Call Continuity (SRVCC) handover.

FIGS. 7A, 7B, and 7C show a tree hierarchy in different steps for determining a sequence of first and second events according to an embodiment of the present invention.

According to one embodiment of the invention the method may further include breaking down the events in the backward and forward windows in a tree hierarchy according to the following steps shown in FIG. 7.

At each step, i.e., tree level the relative occurrence of that event is calculated and that event is added as a new node into the tree with the relative occurrence of that event, as shown in FIG. 7A. In the example, the top level graph nodes event_A, event_B and event_C have been added with relative occurrences of P_1, P_2 and P_3 respectively.

That is, event_A has occurred in the backward window in P_1 fraction of the cases when the negative incident of X has occurred, e.g. P_1=0.8. Note that event_A may have occurred with even_B together in most of the cases but is still considered as a single occurrence one-by-one and taken into account as joint occurrences at a later stage, i.e. as the depth of the tree further grows.

Once all events, e.g. above a relative occurrence threshold, have been added to the tree at the current level, the method may in one embodiment further include summing the relative occurrences of leaves of the tree. In case this sum is greater than 100%, the method further continues with a breakdown of the tree. That is, in case the sum of the relative occurrences of e.g., event A and event B, is greater than 100%, event A and B may occur together in some time windows of the events. Considering there are 10 time window slices of the events, event A may happen for instance eight times and event B may happen for instance six times, then sum of relative occurrence may be 80%+60%=140%. That may mean that in 40% of the cases these events occur together (four times in this case). This may motivate the further breakdown of the tree.

According to one embodiment the method includes as a next step adding new leaves according to the events that occurred, similarly as before, i.e., adding events that have a relative occurrence above a minimum threshold. If there are no further events that can be added, the development or break down of the tree ends.

As shown in FIG. 7B, in one example of the present invention event_B and event_C, for instance under the node of event_A, are added with their relative occurrences of P_11 and P_12. That is, when event_A was present in the window then event_B was also present with P_11 probability and event_C was present in P_12 fraction of the cases.

According to one embodiment of the present invention the method further includes pruning the tree and removing those paths having the same event combinations on them, assuming these are equivalent, i.e. assuming the order of events does not matter. As shown in FIG. 7C the path event_B to event_A is pruned. Note that the original parent node does not necessarily need to be removed, i.e., the occurrence of event_B, but the relative occurrence of the parent node may need to be updated such that the cases where the parent event occurred together with the pruned event, i.e. child event, are subtracted. Then the steps shown in FIG. 7A to 7B may be repeated until all events are added to the sequence.

When the tree construction is finished, the leaves of the tree give the most typical event sequence patterns that occurred together with the investigated negative incident. In the example, (event_A+event_B) and (event_C) with relative occurrence of (P_11+P_12) and (P_3), respectively.

In one embodiment of the present invention the method for determining a sequence of events further comprises the step of determining a cause for the first event based on the sequence of first and second events with the highest probability.

In other words, according to one embodiment of the present invention the created event pattern may be used to determine the sequence of first and second events with highest relative occurrence as the indication of or hint to the root cause of the first event or incident.

According to one embodiment of the invention the method or device carrying out the method may for instance present the most typical event sequences that precede or proceed the negative incident, which may for instance be directly used by service personal to map the event sequences to a most probable problem and possibly take actions to resolve or remedy the problem.

According to one embodiment of the invention certain patterns may be pre-configured for instance in a rule based mapping engine and may be directly mapped to root cause problem without further human intervention.

In one embodiment of the present invention the probability of the occurrence of the at least one second event before the first event is determined separately from the probability of the occurrence of the at least one second event after the first event.

In other words according to one embodiment of the invention the above pattern search may be executed separately or commonly in the forward and backward time windows. It may for instance be up to the configuration whether to differentiate between events happening before and after the incident or treat these equally from that point of view.

According to another embodiment of the invention the order of the events may be taken into account in the pattern search, so that two sequences containing the same events but in different order can be treated as separate. In this case, in the proposed tree creation algorithm, the order of events corresponds to their order on a path and in that case during pruning, two paths containing same events but in different order should not be removed.

In one embodiment of the present invention the probability of the occurrence of the at least one second event before the first event is determined differently from the probability of the occurrence of the at least one second event after the first event. That is, the events occurring before may be treated differently than events occurring after the first event. For instance second events before the first event may be given greater importance, i.e. given greater weight in the determination of the sequence of first and second events. Such weighing may be necessary in order to give greater importance for instance to failed processes such as a failed handover of a user terminal which is more likely to cause ripple effects within the system or the network.

Given the probabilities of occurrences of second events in relation with the first event a sequence of first and second events with the highest probability can be determined.

Eventually a cause for the first event may be determined based on the sequence of first and second events with the highest probability. This may be done manually or automatically. For instance there may be human interaction from which a cause for the first event is determined based on the sequence of first and second events with the highest probability and further expert knowledge. However, there may for instance be a table provided from which a cause can be determined based on the sequence of first and second events with the highest probability, i.e. a correlation between the sequence and the cause is predetermined and used for determining the cause based on the sequence.

In other words, the present invention provides in one embodiment a method of taking an abnormal incident and identifying other incidents occurring before and after the incident, collecting multiple samples for the same abnormal incident and using the above search method to determine the typical event patterns that occur together with the given type of abnormal incident.

In one embodiment of the present invention the at least one second event is identified within a predetermined time before and/or after the first event.

In one embodiment of the present invention the sequence of first and second events is determined including all combinations of first and second events. That is, all combinations are to be considered, i.e. all combinations of first and second events are plausible.

In one embodiment of the present invention the sequence of first and second events is determined including one specific order of first and second events. That is, one or more specific order of first and second events is of greater relevance, i.e. other orders of first and second events may not be plausible.

Although detailed embodiments have been described, these only serve to provide a better understanding of the invention defined by the independent claims and are not to be seen as limiting.

The invention claimed is:

1. A method for determining, in a determination device, a sequence of events including a first event in a mobile communication network system, the method comprising the determination device:
    identifying at least one second event before and/or after the first event;
    determining a probability of an occurrence of each second event before and/or after the first event;
    determining a probability of an occurrence of each second event before and/or after each other second event; and
    determining a sequence of first and second events with the highest probability;
    wherein the first and/or second events are provided by a providing device.

2. The method of claim 1, further comprising determining a cause for the first event based on the sequence of first and second events with the highest probability.

3. The method of claim 1, wherein the first event is a negative type of event and the second events are each a negative or positive type of event.

4. The method of claim 3, wherein the negative type and/or positive type of event is one of a predetermined relevant type.

5. The method of claim 3, wherein the negative type of event is: an abnormal call termination, a performance indicator event, and/or a failed process event.

6. The method of claim 1, wherein the at least one second event is identified within a predetermined time before and/or after the first event.

7. The method of claim 1, wherein the probability of the occurrence of the at least one second event before the first event is determined separately from the probability of the occurrence of the at least one second event after the first event.

8. The method of claim 1, wherein the probability of the occurrence of the at least one second event before the first event is determined differently from the probability of the occurrence of the at least one second event after the first event.

9. The method of claim 1, wherein the sequence of first and second events is determined including all combinations of first and second events.

10. The method of claim 1, wherein the sequence of first and second events is determined including one specific order of first and second events.

11. The method of claim 1:
wherein the negative type of the first and/or second event is:
- a failed connection set up between a base station and a user terminal;
- a failed connection set up between a base station and a network node;
- a failed hand over of a user terminal between base stations;
- a failed signal transfer for communication; or
- a failed signal transfer for controlling a base station; and wherein the positive type of the second event is:
- a successful connection set up between a base station and a user terminal;
- a successful connection set up between a base station and a network node;
- a successful hand over of a user terminal between base stations;
- a successful signal transfer for communication; or
- a successful signal transfer for controlling a base station.

12. A determination device for determining a sequence of events including a first event in a mobile communication network system, the determination device comprising:
processing circuitry;
memory containing instructions executable by the processing circuitry whereby the determination device is operative to:
- identify at least one second event before and/or after the first event;
- determine a probability of an occurrence of each second event before and/or after the first event;
- determine a probability of an occurrence of each second event before and/or after each other second event; and
- determine a sequence of first and second events with the highest probability.

13. The determination device of claim 12, wherein the instructions are such that the determination device is operative to determine a cause for the first event based on the sequence of first and second events with the highest probability.

14. A providing device in a communication network system, the providing device comprising:
detector circuitry configured to detect a first and/or second event, wherein the first event is a failed process, and wherein the second event is either a successful process or a failed process;
processing circuitry;
memory containing instructions executable by the processing circuitry whereby the providing device is operative to:
provide information indicating the first and/or second event to the communication network system or an external entity processing the first and/or second event to determine:
- a cause of the first event;
- a probability of an occurrence of the second event before and/or after the first event;
- a probability of an occurrence of the second event before and/or after each of one or more other second events; and
- a sequence of first and second events with the highest probability.

15. The providing device of claim 14, wherein the providing device is: a mobile terminal, a base station, a network node, a network entity, and/or external equipment associated with the communication network system.

16. A non-transitory computer readable recording medium storing a computer program product for determining, in a determination device, a sequence of events including a first event in a mobile communication network system, the computer program product comprising software instructions which, when run on processing circuitry of the determination device, causes the determination device to:
- identify at least one second event before and/or after the first event;
- determine a probability of an occurrence of each second event before and/or after the first event;
- determine a probability of an occurrence of each second event before and/or after each other second event; and
- determine a sequence of first and second events with the highest probability;

wherein the first and/or second events are provided by a providing device.

* * * * *